United States Patent Office 2,816,894
Patented Dec. 17, 1957

2,816,894
ANAESTHETIC AGENTS

Werner Zerweck and Otto Trösken, Frankfurt am Main, Fechenheim, Germany, assignors to Casella Farbwerke Mainkur Aktiengesellschaft, Frankfurt am Main, Fechenheim, Germany, a company of Germany No Drawing. Application December 9, 1953
Serial No. 397,249

Claims priority, application Germany December 16, 1952

6 Claims. (Cl. 260—294)

This invention comprises new agents of an anaesthetic action and a process for producing the same.

We have found that anaesthetic agents are obtained by allowing to react in any sequence the following compounds $$R_1X + XCOR_2Y + HN\begin{matrix}R_3\\R_4\end{matrix}$$

(wherein $R_1$ means a radical of the group consisting of naphthalene and 5,6,7,8-tetrahydronaphthalene which radical contains in the 1-position the radical X and in the 2-position a substituent of the group consisting of alkyl, alkoxy, alkylmercapto, chlorine; one X means $NH_2$, the other X halogen; $R_2$ means alkylene; Y means halogen; $R_3$ means a radical of the group consisting of hydrogen, alkyl and an alkyl group which is connected with $R_4$; $R_4$ means a radical of the group consisting of alkyl and an alkyl group which is connected with the alkyl group $R_3$) and converting the compounds thus obtained and corresponding to the formula $$R_1NH-CO-R_2-N\begin{matrix}R_3\\R_4\end{matrix}$$

(wherein $R_1$, $R_2$, $R_3$, $R_4$ have the aforesaid significance) into their salts which salts include the corresponding quaternary ammonium salts.

The new compounds are distinguished by a particularly strong anaesthetic action which enables to use the substances in smaller amounts and to suppress thereby to a great extent the side reactions that may be present.

The following examples are given for the purpose of illustrating the invention, the parts being by weight and all temperatures in degrees centigrade.

Example 1.—1-(ω-dimethylamino-acetyl-)amino-2-naphthol-ethyl ether

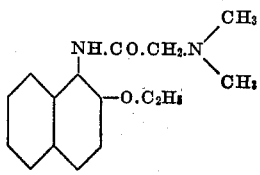

264 parts of 1-chloroacetyl-amino-2-naphthol-ethyl ether (prepared from 1-amino-2-naphthol-ethyl ether and chloroacetylchloride in glacial acetic acid in the presence of sodium acetate; melting point 164° after recrystallizing from methanol) are heated with a solution of 135 parts of dimethyl amine in 1500 parts of benzene for 10 hours under pressure to 110–115°. On cooling, the separated hydrochloric dimethyl amine is removed by filtering with suction and the benzene filtrate is concentrated by vacuum evaporation. The remaining residue is the 1-(ω-dimethylamino - acetyl-)amino - 2 - naphthol ethyl ether which after recrystallizing from benzene-benzine shows a melting point of 107°.

For preparation of the hydrochloric salt, hydrogen chloride is conducted at 0–5° into a solution of the base in benzene, whereby the salt separates in the form of colorless crystals. After recrystallizing from aqueous dioxan, the substance shows a melting point of 240–241°.

Example 2.—1-(ω-diethylamino-acetyl-)amino-2-naphthol-ethyl ether

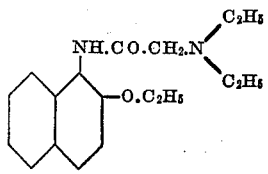

A mixture of 132 parts of 1-chloroacetyl-amino-2-naphthol-ethyl ether and 110 parts of diethyl amine in 1500 parts of benzene is boiled for 10 hours under reflux. After removing the hydrochloric diethyl amine, which has crystallized out, by filtering with suction and after evaporating the benzene, the 1-(ω-diethylamino-acetyl-)amino-2-naphthol-ethyl ether remains as a solid residue. After dissolving in benzine and allowing to crystallize therefrom, the substance forms colorless crystals of a melting point of 90–92°.

The hydrochloric salt, obtained by conducting hydrogen chloride into a solution of the base in benzene, melts at 201–202° after recrystallizing from dioxan.

Example 3.—1-(ω-piperidino-acetyl-)amino-2-naphthol-ethyl ether

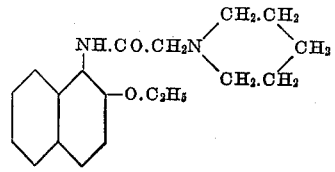

255 parts of piperidine and 264 parts of 1-chloroacetyl-amino-2-naphthol-ethyl ether are boiled in 3000 parts of benzene for 10 hours under reflux. After removing by filtration the hydrochloric piperidine which has crystallized out, the benzene filtrate is concentrated by evaporation in vacuum. The solid residue thereby obtained is washed out with water. After drying, the water-insoluble 1-(ω-piperidino-acetyl-)amino-2-naphthol-ethyl ether is recrystallized from benzine-benzene; its melting point is 126–127°.

The hydrochloric salt forms, after dissolving in aqueous dioxan and allowing to crystallize therefrom, colorless crystals of a melting point of 251–252°.

When 1-chloroacetylamino-2-naphthol-ethyl ether is replaced by 1 - chloroacetylamino - 2 - chloronaphthalene (melting point 190°), a product of similar properties (melting at 123°) is obtained.

Example 4.—1-(ω-diethylamino-acetyl-)amino-2-thionaphthol-methyl ether

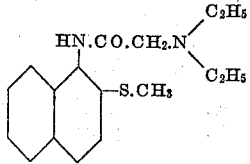

To 189 parts of 1-amino-2-thionaphtholmethyl ether in 1000 parts of glacial acetic acid and in the presence of 100 parts of anhydrous sodium acetate there are added, in the course of 2 hours and at 5–10°, 125 parts of chloroacetylchloride. The reaction is completed by stirring for several hours at room temperature. Thereafter, the mass is poured, whilst stirring, on to 5000 parts of ice. The separated colorless substance is filtered by suction and washed out with water. The 1-chloroacetylamino-2-thionaphthol-methyl ether forms, after recrystallizing from methanol, colorless crystals of a melting point of 190–191°.

133 parts of 1-chloroacetylamino-2-thionaphthol-methyl ether are boiled with 110 parts of diethyl amine in 750 parts of benzene for 10 hours under reflux. On cooling, the separated hydrochloric diethyl amine is removed by filtering with suction and the excess of diethyl amine and the benzene are removed by distillation from the filtrate. The 1 - (ω-diethylamino-acetyl)amino - 2 - thionaphthol-methyl ether thereby obtained as a solid mass shows, after recrystallizing from benzine, a melting point of 85–86°.

The hydrochloric salt is obtained by conducting at 0–5° hydrogen chloride into a solution of the base in ether. After dissolving in aqueous dioxan and allowing to crystallize therefrom, it forms colorless crystals of a melting point of 215–217°.

*Example 5.—1-(cyclohexylamino-acetyl-)amino-2-methyl-naphthalene*

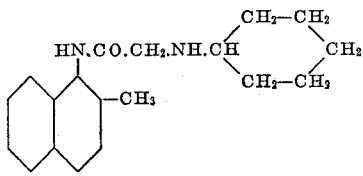

234 parts of 1-chloroacetylamino-2-methyl-naphthalene are boiled with 600 parts of cyclohexyl amine in 1000 parts of benzene for 10 hours under reflux. On cooling, the hydrochloric cyclohexyl amine which has crystallized out is removed by filtering with suction and the benzene and the excess of cyclohexyl amine are removed from the filtrate by distillation under reduced pressure. The residue thereby obtained is taken up in ether; by conducting hydrogen chloride into this solution, the hydrochloric 1-(cyclohexyl-amino-acetyl-)amino-2-methyl-naphthalene separates in the form of colorless crystals showing a melting point of 266° after recrystallizing from aqueous dioxan.

*Example 6.—1-(benzylamino-acetyl-)amino-2-methyl-naphthalene*

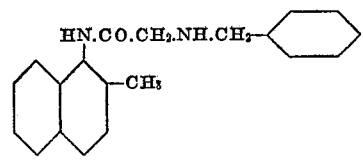

A solution of 234 parts of 1-chloroacetylamino-2-methyl-naphthalene and 430 parts of benzyl amine in 1000 parts of benzene is boiled for 10 hours under reflux. On cooling, the hydrochloric benzyl amine which has crystallized out is removed by filtering with suction and the filtrate is concentrated by evaporation. The remaining residue is the 1-(benzylamino-acetyl)-amino-2-methyl-naphthalene which shows a melting point of 148–149° after recrystallizing from benzene.

Its hydrochloric salt, obtained by conducting hydrogen chloride into a solution of the base in benzene, forms colorless crystals of a melting point of 222–223° after recrystallizing from aqueous dioxan.

*Example 7.—Quaternary ammonium salt from 1-(piperidino-acetyl-)amino-2-methyl-naphthalene and ethyl bromide*

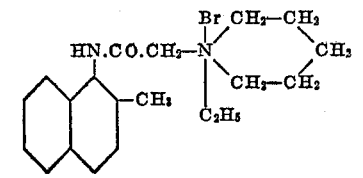

141 parts of 1-(piperidinoacetyl-)amino-2-methyl-naphthalene are heated with 60 parts of ethyl bromide in 500 parts of chlorobenzene for 10 hours to 100°. On cooling, the ammonium salt which has crystallized out is separated by filtering with suction and dried in vacuum. After dissolving in acetone and crystallizing therefrom, it represents colorless crystals of a melting point of 221–222°.

*Example 8.—1-(N-ω-dimethyl-amino-acetyl-)amino-2-methyl-naphthalene*

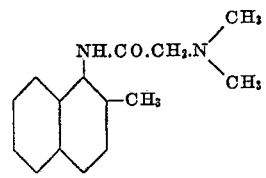

A solution of 135 parts of dimethylamine in 1500 parts of benzene is heated with 234 parts of 1-chloroacetyl-amino-2-methyl-naphthalene (prepared from 1-amino-2-methyl-naphthalene and chloroacetylchloride in glacial acetic acid solution in the presence of sodium acetate, melting point 181–182° after recrystallizing from methanol) for 10 hours under pressure to 110–120°. On cooling, the separated hydrochloric dimethyl amine is removed by filtering with suction and the clear benzene filtrate is concentrated by vacuum evaporation. The residue is recrystallized from benzene; thus the 1-(N-ω-dimethylamino-acetyl-)amino-2-methyl-naphthalene is obtained in the form of colorless crystals having a melting point of 130–131°.

For preparation of the hydrochloric salt, hydrogen chloride is conducted into a benzene solution of the base at 0–5°, whereby the salt separates in the form of colorless crystals. When recrystallized from dioxan with the addition of a small amount of water, the substance shows a melting point of 246–248°.

*Example 9.—1-(N-ω-diethylamino-acetyl-)amino-2-methyl-naphthalene*

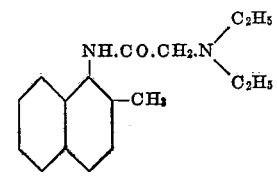

A mixture of 234 parts of 1-chloroacetyl-amino-2-methyl-naphthalene and 220 parts of diethyl amine in 2000 parts of benzene is boiled for 5 hours under reflux. On cooling, the separated hydrochloric diethyl amine is removed by filtering with suction. From the filtrate, the excess of diethyl amine and the benzene are removed by distillation under reduced pressure. The residue shows, after recrystallizing from benzine, a melting point of 98°.

The hydrochloric salt, which is obtained by dissolving the base in aqueous hydrochloric acid, forms, after recrystallizing from diluted dioxan, colorless crystals of a melting point of 225–226°.

*Example 10.—1-(N-ω-piperidino-acetyl-)amino-2-methyl-naphthalene*

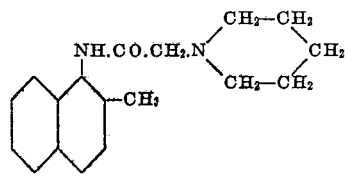

255 parts of piperidine and 234 parts of 1-chloroacetyl-amino-2-methyl-naphthalene are boiled in 1000 parts of benzene for 10 hours with stirring and under reflux. On cooling, the separated piperidine is removed by filtering with suction and the benzene filtrate is concentrated by evaporation in vacuum. The solid residue is boiled out with water in order to remove any remainder of piperidine. After drying, the water-insoluble 1-(piperidino-acetyl-)amino-2-methyl-naphthalene is recrystallized from benzine. The melting point of the substance is 103°.

The hydrochloric salt is prepared in a usual manner and shows a melting point of 219-220° after recrystallizing from diluted dioxan.

If using 213 parts of pyrrolidine in place of the 255 parts of piperidine of the preceding example, there is obtained under the same conditions the 1-(N-pyrrolidino-acetyl-)amino-2-methyl-naphthalene of a melting point of 148-149° after recrystallizing from diluted methanol. The hydrochloric salt of this base after recrystallizing from aqueous dioxan shows a melting point of 214-216°.

When piperidine is replaced by morpholine, a product of similar properties, melting at 123-124°, is obtained.

*Example 11.—1 - (N - ω - diethylamino-acetyl - )amino-2-methyl-5,6,7,8-tetrahydronaphthalene*

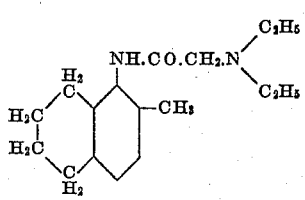

A solution of 110 parts of diethyl amine in 500 parts of benzene is boiled with 119 parts of 1-chloroacetyl-amino-2-methyl-5,6,7,8-tetrahydronaphthalene (prepared by reacting 1-amino-2-methyl - 5,6,7,8 - tetrahydronaphthalene with chloroacetylchloride in glacial acetic acid in the presence of sodium acetate, melting point 161-163° after recrystallizing from methanol) for 10 hours under reflux. On cooling, the separated hydrochloric diethyl amine is removed by filtering with suction. After removing the excess of diethyl amine as well as the benzene by evaporation, the 1-(N-ω-diethylaminoacetyl-)amino-2-methyl-5,6,7,8-tetrahydronaphthalene is obtained as a weakly brownish oil which may be purified by distillation under reduced pressure. At 10 millimeters of mercury pressure, the substance has a melting point of 236-230°.

When conducting hydrogen chloride into a solution of this base in ether at 5-10°, the hydrochloric salt separates as a solid, colorless substance which shows a melting point of 215-216° after recrystallizing from dioxan.

The 1-(N-ω-piperidinoacetyl-)amino-2-methyl-5,6,7,8-tetrahydronaphthalene is obtained by reacting in an analogous manner 119 parts of 1-chloroacetyl-amino-2-methyl-5, 6, 7, 8-tetrahydronaphthalene with 127.5 parts of piperidine in 500 parts of benzene. After dissolving in benzine and allowing to crystallize therefrom, the product forms colorless crystals of a melting point of 78-79°.

*Example 12.—1-(methyl-γ-phenyl-propyl-amino-acetyl-)amino-2-methyl-naphthalene*

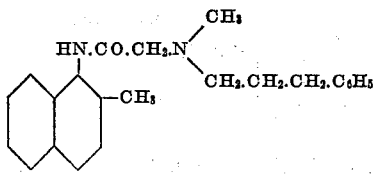

117 parts of 1-chloroacetylamino-2-methylnaphthalene are boiled with 225 parts of methyl-(γ-phenyl-propyl-)amine in 500 parts of benzene for 12 hours under reflux. On cooling, the separated hydrochloric methyl-(γ-phenyl-propyl-)amine is removed by filtering with suction. By conducting hydrogen chloride into the benzene filtrate, the hydrochloric 1-(methyl-γ-phenyl-propyl - amino-acetyl-)amino-2-methylnaphthalene is obtained in the form of colorless crystals, which after dissolving in diluted hydrochloric acid and allowing to crystallize therefrom has a melting point of 94-95°.

*Example 13.—1-(piperidino-acetyl-)amino-2-naphthol propyl-ether*

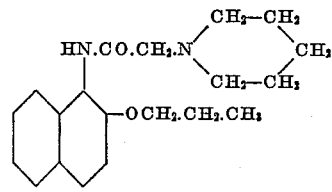

278 parts of 1-chloroacetyl-amino-2-naphthol propyl-ether (prepared from 1-amino-2-naphtholpropyl-ether and chloroacetylchloride in glacial acetic acid in the presence of sodium acetate, melting point 164° after recrystallizing from methanol) are boiled with 250 parts of piperidine in 2000 parts of benzene for 10 hours under reflux. After removing by filtration the hydrochloric piperidine which has crystallized out, the benzene filtrate is concentrated by evaporation in vacuum. The solid residue thereby obtained is washed out with water and the water-insoluble 1-(piperidino-acetyl-)amino-2-naphthol propyl-ether is dried and recrystallized from benzene; melting point 93-94°.

The hydrochloric salt, obtained by conducting hydrogen chloride into a solution of the base in benzene, melts at 210° after recrystallizing it from aqueous dioxan.

*Example 14.—1-(piperidino-acetyl-)amino-2-naphthol butyl-ether*

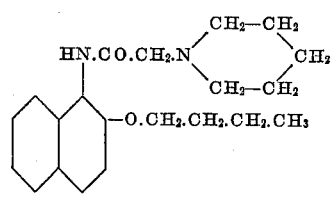

291 parts of 1-chloroacetyl-amino-2-naphthol butyl-ether (prepared from 1-amino-2-naphthol butyl-ether and chloroacetyl-chloride in glacial acetic acid in the presence of sodium acetate, melting point 160-161° after recrystallizing from methanol) are reacted with 250 parts of piperidine in 2000 parts of benzene as indicated in Example 13 and worked up in an analogous manner. The 1-(piperidino-acetyl-)amino-2-naphthol butyl-ether thus obtained shows after recrystallizing from benzine a melting point of 83-84°; its chlorohydrate represents, after dissolving in aqueous dioxan and allowing to crystallize therefrom, colorless crystals of a melting point of 213-214°.

*Example 15.—1-(methyl-γ-phenyl-propyl-amino-acetyl-)amino-2-naphthol butyl-ether*

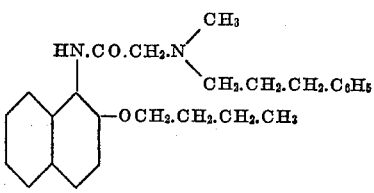

291 parts of 1-chloroacetylamino-2-naphthol butyl-ether are boiled with 450 parts of methyl-(γ-phenyl-propyl-)amine in 2000 parts of benzene for 10 hours under reflux. On cooling, the mass is filtered by suction. After evaporating the benzene, a residue representing a brownish oil is obtained from which the excess of methyl-(γ-phenyl-propyl-)amine is removed by means of water vapor. There is taken up in ether and, after drying of the solution over Glauber's salt, hydrogen chloride is conducted in at 5-10° until saturation is reached. The hydrochloric 1-(methyl-γ-phenyl-propyl-amino-acetyl-)amino-2-naphthol butyl-ether thus obtained forms, after dissolving in diluted dioxan and allowing to crystallize therefrom, colorless crystals of a melting point of 156–157°.

*Example 16.—1-(piperidino-acetyl-)amino-2-naphthol isobutyl ether*

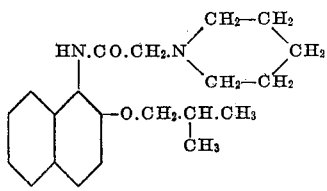

291 parts of 1-chloroacetylamino-2-naphthol isobutyl ether (prepared from 1-amino-2-naphthol isobutyl ether and chloroacetylchloride in acetic acid solution in the presence of sodium acetate, melting point 171° after recrystallizing from methanol) are reacted with 250 parts of piperidine in 2000 parts of benzene and worked up in an equal manner as described for the preparation of the 1-(piperidino-acetyl-)amino-2-naphthol propyl-ether. After dissolving the 1-(piperidino-acetyl-)amino-2-naphthol isobutyl ether in benzine and crystallizing it therefrom, it forms colorless crystals having a melting point of 103–105°. The hydrochloric salt melts at 203–204° after recrystallizing from aqueous dioxan.

*Example 17.—1-(β-diethylamino-propionyl-)amino-2-naphthol-ethyl ether*

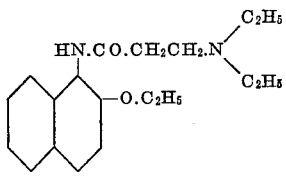

278 parts of 1-(β-chloropropionyl-)amino-2-naphthol-ethyl ether (prepared from 1-amino-2-naphtholethyl ether and β-chloropropionylchloride in glacial acetic acid in the presence of sodium acetate, melting point 167–168° after recrystallizing from alcohol) are boiled with 220 parts of diethyl amine in 1000 parts of benzene for 10 hours under reflux and are worked up as indicated in the preceding examples. The 1-(β-diethylamino-propionyl-)amino-2-naphthol-ethyl ether crystallizes from benzine in the form of colorless needles having a melting point of 98–99°, its chlorohydrate shows a melting point of 159–160°.

*Example 18.—1-(piperidino-acetyl-)amino-5,6,7,8-tetrahydro-2-naphthol-ethyl ether*

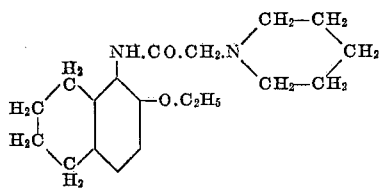

After adding 100 parts of sodium acetate to a solution of 191 parts of 1-amino-5,6,7,8-tetrahydro-2-naphthol-ethyl ether (prepared by hydrogenation of 1-amino-2-naphtholethyl ether with sodium in amyl alcohol, boiling point at 19 millimeters of mercury pressure: 190–195°) in 1000 parts of glacial acetic acid, there are added at 5–10° in the course of 2 hours 125 parts of chloroacetylchloride by dropping in. The reaction mass is after-stirred for 12 hours at 15–20° and then poured on to ice. The separated colorless substance is filtered by suction and washed out with water. The 1-chloroacetylamino-5,6,7,8-tetrahydro-2-naphthol-ethyl ether crystallizes from alcohol in the form of colorless needles having a melting point of 153–154°.

130 parts of piperidine and 134 parts of 1-chloroacetyl-amino-5,6,7,8-tetrahydro-2-naphthol-ethyl ether are boiled in 500 parts of benzene for 10 hours under reflux. On cooling, the separated hydrochloric piperidine is removed by filtering with suction and the benzene filtrate is concentrated by vacuum evaporation. The residue thereby obtained represents the 1-(piperidino-acetyl-)amino-5,6,7,8-tetrahydro-2-naphthol-ethyl ether which after recrystallizing from benzine shows a melting point of 81–82°. The hydrochloric salt is prepared in a usual manner; after dissolving in dioxan and allowing to crystallize therefrom, it shows a melting point of 198–199°.

We claim:

1. The new basic compounds and their salts represented by the general formula of the basic compounds

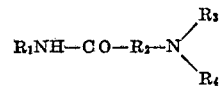

wherein $R_1$ means a radical of the group consisting of naphthalene and 5,6,7,8-tetrahydronaphthalene which radical contains in the 1-position the —NH-radical and in the 2-position a substituent of the group consisting of lower alkyl, lower alkoxy, lower alkylmercapto, and chlorine; $R_2$ means lower alkylene; $R_3$ means a radical of the group consisting of hydrogen, lower alkyl and a lower alkyl group which is connected with $R_4$; $R_4$ means a radical of the group consisting of lower alkyl and a lower alkyl group which is connected with the lower alkyl group $R_3$.

2. The 1-(piperidino-acetyl-)amino-2-methyl-naphthalene of the formula

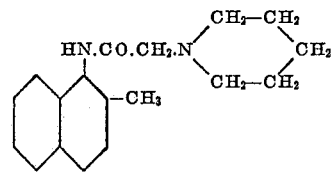

3. The 1 - (methyl - γ - phenyl - propyl - amino-acetyl-)amino-2-methyl-naphthalene of the formula

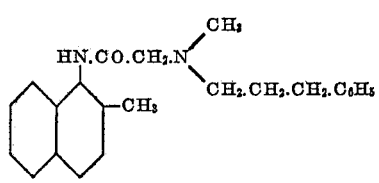

4. The 1 - (piperidino - acetyl - )amino - 2 - naphthol propyl-ether of the formula

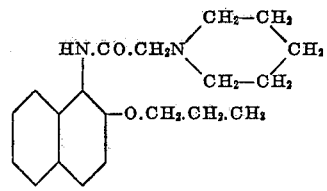

5. The 1 - (piperidino - acetyl - )amino - 2 - naphthol butyl-ether of the formula

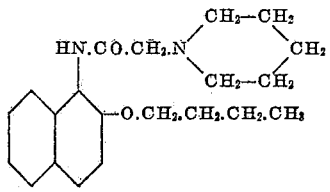

6. The 1 - (piperidino - acetyl - )amino - 2 - naphthol isobutyl ether of the formula
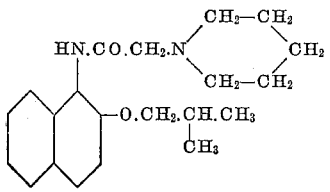
References Cited in the file of this patent
UNITED STATES PATENTS
| | | |
|---|---|---|
| 1,918,648 | Korten | July 18, 1933 |
| 1,919,592 | Klingemann et al. | July 25, 1933 |
OTHER REFERENCES
Erdtman: Chem. Abstracts, vol. 36, col. 6797 (1942).
Lofgren: Chem. Abstracts, vol. 43, cols. 1021–22 (1949).
Marini-Bettolo et al.: Chem. Abstracts, vol. 45, col. 8991 (1951).

U. S. DEPARTMENT OF COMMERCE

PATENT OFFICE

CERTIFICATE OF CORRECTION

Patent No. 2,816,894                                 December 17, 1957

Werner Zerweck et al.

It is hereby certified that error appears in the printed specification of the above numbered patent requiring correction and that the said Letters Patent should read as corrected below.

Column 5, line 44, for "melting point of 236-230°" read -- boiling point of 226-230° --.

Signed and sealed this 22nd day of April 1958.

(SEAL)
Attest:
KARL H. AXLINE                                    ROBERT C. WATSON
Attesting Officer                                Commissioner of Patents